United States Patent
Waller et al.

(10) Patent No.: US 11,789,681 B1
(45) Date of Patent: Oct. 17, 2023

(54) CLOUD PRINTING SERVICES FOR PRINTING TO DIFFERENT TYPES OF PRINTERS

(71) Applicants: Marquis G. Waller, Beverly, OH (US); Gerald Donald Boldt, Longmont, CO (US); Tadao Yamasaki, Boulder, CO (US); Steve Cousins, Boulder, CO (US)

(72) Inventors: Marquis G. Waller, Beverly, OH (US); Gerald Donald Boldt, Longmont, CO (US); Tadao Yamasaki, Boulder, CO (US); Steve Cousins, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/706,197

(22) Filed: Mar. 28, 2022

(51) Int. Cl.
*G06F 3/12* (2006.01)

(52) U.S. Cl.
CPC .......... *G06F 3/1261* (2013.01); *G06F 3/1207* (2013.01); *G06F 3/1232* (2013.01); *G06F 3/1274* (2013.01); *G06F 3/1287* (2013.01); *G06F 3/1292* (2013.01)

(58) Field of Classification Search
CPC .... G06F 3/1261; G06F 3/1207; G06F 3/1232; G06F 3/1274; G06F 3/1287
USPC .......................... 358/1.15; 709/239, 240, 242
See application file for complete search history.

(56) References Cited

U.S. PATENT DOCUMENTS

| | | | |
|---|---|---|---|
| 7,872,765 B2 | 1/2011 | Liu | |
| 7,880,912 B2 | 2/2011 | Eldridge | |
| 8,773,694 B2 | 7/2014 | Takagi et al. | |
| 2002/0097424 A1* | 7/2002 | Ferlitsch | G06F 3/1287 358/1.15 |
| 2007/0035763 A1* | 2/2007 | Bard | G06F 3/1267 358/1.15 |
| 2010/0171973 A1* | 7/2010 | Kimura | G06F 3/1228 358/1.14 |

FOREIGN PATENT DOCUMENTS

| | | |
|---|---|---|
| CN | 110908621 A | 3/2020 |
| CN | 113190187 A | 7/2021 |
| CN | 113282255 A | 8/2021 |
| EP | 1006431 A1 * | 6/2000 ........... G06F 3/1206 |

OTHER PUBLICATIONS

How Can I store Difference Printer Trays; https://support.timesensor.com/protal/en/kb/articles; Jan. 13, 2022.

* cited by examiner

*Primary Examiner* — Jamares Q Washington
(74) *Attorney, Agent, or Firm* — Duft & Bornsen, PC (57) ABSTRACT

System, method, and software of providing a printing service. In one embodiment, a printing system comprises a cloud printing service that stores device capability information for different types of printers supervised by a print server. The cloud printing service receives a print job, identifies a plurality of the printers that are capable of printing the print job based on the device capability information, and transforms printable content and control data of the print job into a plurality of printer-specific print streams. Each of the printer-specific print streams is in a printable output format for one of the plurality of printers. The cloud printing service provides one or more of the printer-specific print streams to the print server.

20 Claims, 9 Drawing Sheets

CLOUD PRINTING SERVICES FOR PRINTING TO DIFFERENT TYPES OF PRINTERS

TECHNICAL FIELD

The following disclosure relates to the field of printing, and more particularly, to printing services.

BACKGROUND

Print Service Providers (PSP) or other providers offer printing services to users/customers in exchange for monetary compensation. A PSP typically operates a print shop that includes a variety of printers managed by a print server. For a printing service in general, a user submits a print job to the PSP, and the print server schedules the print job with a printer under its domain. The printer marks a print medium (e.g., paper) based on the incoming print data of the print job resulting in a print product, such as advertising or marketing materials, product manuals, books, invoices/bills, blueprints, mailings, etc.

A user will commonly submit a file or document for the print job in a file format or image format, such as Portable Document Format (PDF), Tag Image File Format (TIFF), Joint Photographic Experts Group (JPEG), etc. The print server selects a printer for the print job, transforms the file or document of the print job into a print stream according to the Page Description Language (PDL) understood by the selected printer, and transfers the print stream to the selected printer. One potential issue is the print server has limited resources for processing print jobs, and large print jobs may take an extended period of time to process. Another potential issue is if an error occurs in printing the print job at the selected printer, the print server may have to select an alternate printer of a different type and re-transform the file or document of the print job into a print stream according to the PDL understood by the alternate printer. This again may take an extended period of time, making it difficult for the PSP to meet an agreed-upon timeline for printing the print job.

SUMMARY

Embodiments described herein are printing systems and methods of operating a printing system where the transform process of transforming a file or document of a print job into a PDL-compliant print stream is decoupled from the print server, and the transform process is moved to the cloud. As an overview, a cloud printing service maintains information for different printers, such as for a print shop. When receiving a print job from a user, the cloud printing service transforms the file or document of the print job into multiple print streams each specific to an individual printer. The print server may then retrieve one or more of the print streams for the print job from the cloud printing service to print the print job on a desired printer. The cloud printing service as described herein provides a technical benefit in that a cloud-computing platform is "serverless" and can spin up additional resources as needed for processing print jobs. Thus, the cloud printing service may be faster and more effective at processing large print jobs. Also, the cloud printing service can create the multiple print streams for the different printers in parallel so that the print server may print the print job on any of the printers as desired. Thus, a PSP may manage a vendor-neutral fleet of printers through the cloud printing service.

In one embodiment, a printing system comprises processing resources and storage resources provisioned on a cloud-computing platform to implement a cloud printing service. The processing resources at least cause the cloud printing service to store device capability information for different types of printers supervised by a print server, receive a print job, identify a plurality of the printers that are capable of printing the print job based on the device capability information, and transform printable content and control data of the print job into a plurality of printer-specific print streams. Each of the printer-specific print streams is in a printable output format for one of the plurality of the printers. The processing resources at least cause the cloud printing service to provide one or more of the printer-specific print streams to the print server.

In one embodiment, the processing resources at least cause the cloud printing service to wait for confirmation from the print server that the print job has ended, and delete the printer-specific print streams after a retention period in response to receiving the confirmation.

In one embodiment, the processing resources at least cause the cloud printing service to transform the printable content and the control data of the print job into the plurality of printer-specific print streams in parallel.

In one embodiment, the printing system further comprises the print server comprising at least one processor and memory. The processor causes the print server to receive a message from the cloud printing service that the print job is pending, select a printer from the plurality of the printers as a selected printer for printing the print job, and retrieve the one or more of the printer-specific print streams from the cloud printing service. The one or more of the printer-specific print streams retrieved by the print server includes a first printer-specific print stream for the selected printer. The processor causes the print server to schedule the first printer-specific print stream to print at the selected printer.

In one embodiment, the processor causes the print server to retrieve the first printer-specific print stream from the cloud printing service exclusively in response to selecting the selected printer for printing the print job.

In one embodiment, the processor causes the print server to retrieve multiple ones of the printer-specific print streams from the cloud printing service for multiple printers of the plurality of the printers determined to be available to print the print job.

In one embodiment, the processor causes the print server to retrieve a print job package from the cloud printing service that contains each of the printer-specific print streams generated by the cloud printing service.

In one embodiment, the processor causes the print server to monitor progress of the print job at the selected printer, and select, when an error occurs, another printer from the plurality of the printers as an alternate printer for printing the print job. The one or more of the printer-specific print streams retrieved by the print server includes a second printer-specific print stream for the alternate printer. The processor causes the print server to schedule the second printer-specific print stream to print at the alternate printer.

In one embodiment, a method of operating a printing system comprises the following steps performed at a cloud printing service: storing device capability information for different types of printers supervised by a print server, receiving a print job, identifying a plurality of the printers that are capable of printing the print job based on the device capability information, and transforming printable content and control data of the print job into a plurality of printer-specific print streams. Each of the printer-specific print streams is in a printable output format for one of the plurality of the printers. The method further comprises providing one or more of the printer-specific print streams from the cloud printing service to the print server.

In one embodiment, the method further comprises the following steps performed at the cloud printing service: waiting for confirmation from the print server that the print job has ended, and deleting the printer-specific print streams from the cloud printing service after a retention period in response to receiving the confirmation.

In one embodiment, transforming the printable content and the control data of the print job into the plurality of printer-specific print streams at the cloud printing service comprises transforming the printable content and the control data of the print job into the plurality of printer-specific print streams in parallel.

In one embodiment, the method further comprises the following steps performed at the print server: receiving a message from the cloud printing service that the print job is pending, selecting a printer from the plurality of the printers as a selected printer for printing the print job, and retrieving the one or more of the printer-specific print streams from the cloud printing service. The one or more of the printer-specific print streams retrieved by the print server includes a first printer-specific print stream for the selected printer. The method further comprises scheduling the first printer-specific print stream to print at the selected printer.

In one embodiment, retrieving the one or more of the printer-specific print streams from the cloud printing service comprises retrieving the first printer-specific print stream from the cloud printing service exclusively in response to selecting the selected printer for printing the print job.

In one embodiment, retrieving the one or more of the printer-specific print streams from the cloud printing service comprises retrieving multiple ones of the printer-specific print streams from the cloud printing service for multiple printers of the plurality of the printers determined to be available to print the print job.

In one embodiment, retrieving the one or more of the printer-specific print streams from the cloud printing service comprises retrieve a print job package from the cloud printing service that contains each of the printer-specific print streams generated by the cloud printing service.

In one embodiment, the method further comprising the following steps performed at the print server: monitoring progress of the print job at the selected printer, and selecting, when an error occurs, another printer from the plurality of the printers as an alternate printer for printing the print job. The one or more of the printer-specific print streams retrieved by the print server includes a second printer-specific print stream for the alternate printer. The method further comprises scheduling the second printer-specific print stream to print at the alternate printer.

Other embodiments may include computer readable media, other systems, or other methods as described below.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the present disclosure are now described, by way of example only, and with reference to the accompanying drawings. The same reference number represents the same element or the same type of element on all drawings.

DETAILED DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
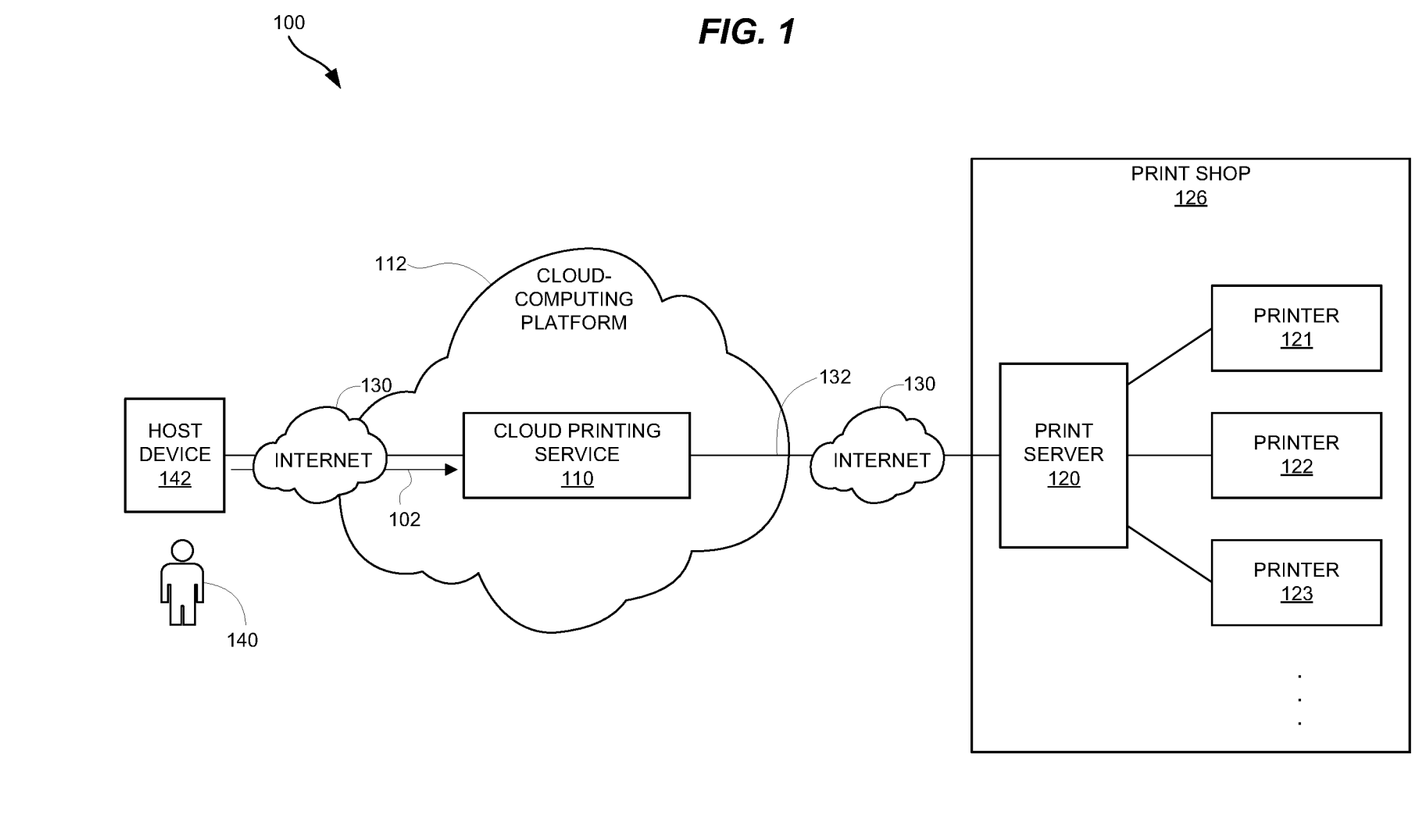
FIG. 1 illustrates a printing system in an illustrative embodiment.

FIG. 1 illustrates a printing system 100 in an illustrative embodiment. In this embodiment, printing system 100 includes a cloud printing service 110, a print server 120, and a plurality of printers 121-123. Print server 120 and printers 121-123 are illustrated in a print shop 126 of a PSP or the like that provides printing services to users/customers in exchange for monetary compensation. In one embodiment, print shop 126 may be configured to provide commercial and/or industrial printing services, which are referred to herein as production printing services. However, print shop 126 may be configured to provide other types of services in other embodiments. Printers 121-123 are shown as being at the same location in the example of FIG. 1, but may be at different locations in other examples.

Print server 120 is an intermediary between the cloud printing service 110 and printers 121-123. Print server 120 may be considered "on the ground" with printers 121-123 by being directly connected to printers 121-123 via wired or wireless connections. In one embodiment, print server 120 is configured to manage or supervise different types of printers 121-123 that have different specifications. For example, one or more of printers 121-123 may be a production printer (e.g., continuous-feed inkjet printer), desktop printer, 3D printer, plotter or wide-format printer, etc. One or more of printers 121-123 may be from different manufacturers, such as Ricoh, Hewlett-Packard (HP), Konica, Canon, Kyocera, etc., and/or have different hardware, software, operating systems, etc. One or more of printers 121-123 may be configured to print on different types or forms of print media, such as standard weight paper, glossy or matte stock, cut-sheet, continuous-forms, etc. One or more of printers 121-123 may be configured to print on different media sizes, such as letter, legal, A4, extra-large, etc. One or more of printers 121-123 may be configured to print in different colors, such as color or monochrome. One or more of printers 121-123 may be configured with different finishing or post-print options, such as glosses or textures, binding, cutting/trimming, embossing, laminating, etc.

Although not shown in FIG. 1, a printer 121-123 generally includes a print controller and one or more print engines. The print controller receives a printer-compliant print stream (e.g., PDL-compliant data), generates rasterized data from the printer-compliant print stream, and transmits the rasterized data to one or more print engines, which mark a print media with the rasterized data. The print engine may use a variety of marking materials for marking a print media, such as ink (e.g., water, solvent, oil, or UV-curable), oil-based paints, additive manufacturing materials, toner, etc. The print media may comprise any type of material upon which ink or another type of marking material is applied, such as paper, plastic, card stock, transparent sheets, a substrate for 3D printing, cloth, etc.

Print shop 126 may include other printers or other devices not shown in FIG. 1. Printing system 100 may also include multiple print shops or other entities that utilize the cloud-printing service 110.

Cloud-printing service 110 is implemented on a cloud-computing platform 112. Cloud-computing allows users access to a variety of services over an internet connection. Some examples of cloud-computing platform 112 may comprise Amazon Web Services (AWS), Google Cloud, Microsoft Azure, etc. Cloud printing service 110 acts as a front-end for a printing service provided by a PSP or the like. At a high level, a user 140 (or customer) is able to submit a print job 102 to the cloud printing service 110 through a host device 142, such as a computer, a smartphone, or another device. The cloud printing service 110 translates the print job 102 into a plurality of printer-specific print streams that are stored in the cloud. Print server 120 is able to pull or otherwise retrieve a printer-specific print stream for an appropriate printer 121-123 from the cloud, and send the printer-specific print stream to the printer 121-123 to generate printed output. Operation of the cloud printing service 110 and the print server 120 are described in more detail below.

Print server 120 is shown in FIG. 1 as being able to communicate with the cloud printing service 110 over the internet 130. Likewise, host device 142 is shown as being able to communicate with the cloud printing service 110 over the internet 130. The internet 130 as referred to herein is a system of interconnected computer networks that uses the Internet protocol suite (e.g., TCP/IP) to communicate between networks and devices, although other protocols may be developed in the future.

Figure 2:
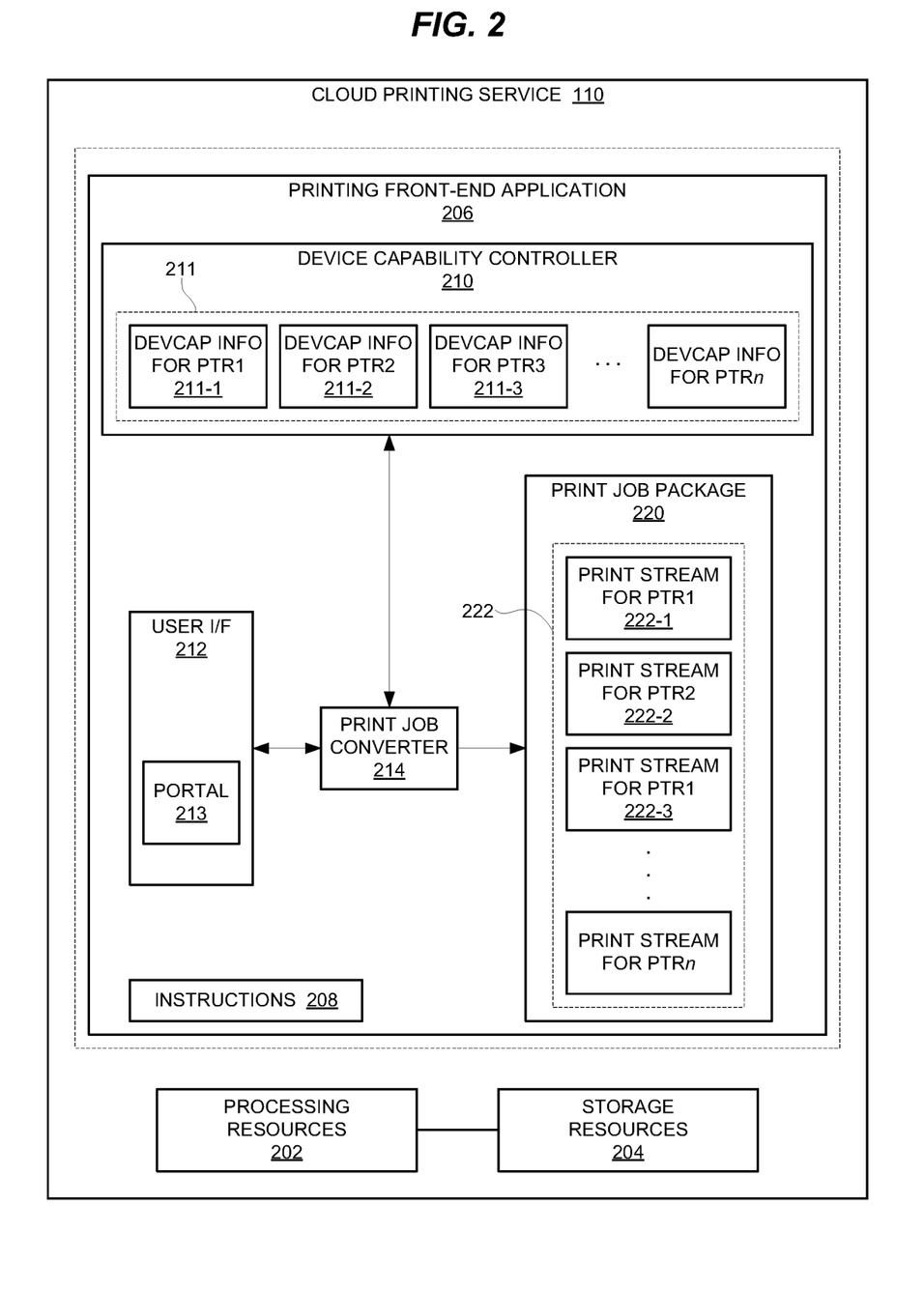
FIG. 2 is a block diagram of a cloud printing service in an illustrative embodiment.

FIG. 2 is a block diagram of the cloud printing service 110 in an illustrative embodiment. To implement the cloud printing service 110, cloud resources are provisioned in a cloud-computing environment (e.g., AWS), such as processing resources 202 and storage resources 204 (although other resources are considered herein). A printing front-end application 206 may be built upon the provisioned resources with instructions 208, programming, code, etc. In one embodiment, printing front-end application 206 provides a device capability controller 210, a user interface (I/F) 212, and a print job converter 214. Device capability controller 210 is configured to manage device capability information 211 for printers, such as printers 121-123 of print shop 126. For example, device capability controller 210 may obtain, collect, or receive device capability (DEVCAP) information 211-1, 211-2, and 211-3 for printers 121, 122, and 123, respectively. Device capability information 211 indicates the printer capabilities and/or attributes of a printer. For example, the device capability information 211 may include a printer manufacturer, a printer model, a serial number, printer resolution, print engine type (e.g., color or monochrome), printer speed, media types supported, media sizes supported, PDLs supported (e.g., PostScript, Printer Command Languages (PCL), etc.), network protocols supported (e.g., TCP/IP, Line Printer Remote (LPR), Internet Printing Protocol (IPP), Hypertext Transfer Protocol (HTTP), Simple Network Management Protocol (SNMP), etc.), page layouts supported (e.g., N-up), post-print or finishing activities supported (e.g., binding, cutting/trimming, embossing, laminating, etc.), and/or other capabilities or attributes.

User interface 212 is a module of the cloud printing service 110 that interacts with users 140, such as to submit print jobs 102 to the cloud printing service 110. In one embodiment, user interface 212 may comprise a portal 213 that provides a user 140 access to the cloud printing service 110. For example, portal 213 may provide a login page for a user 140, a print tools page that allows a user to upload or submit print jobs 102 or print files, define control data for print files (e.g., through a default template or custom template), etc., and/or provide any other desired pages for the cloud printing service 110. In other embodiments, user interface 212 may allow users 140 to submit print jobs 102 through email, File Transfer Protocol (FTP), or through another means.

Print job converter 214 is configured to generate a plurality of printer-specific print streams 222 for different printers 121-123 from the print job 102. A print job 102 submitted from a user 140 to the cloud printing service 110 may be considered a "raw" print job, as the print job 102 cannot be consumed directly by a printer 121-123. A print job 102 as described herein includes printable content (e.g., the content of text and/or images that are actually to be printed and seen on a resulting printed page), and control data that describes other attributes of the printing task that is independent of the printable content. The printable content for a print job 102 may comprise a file or document for printing (e.g., a .pdf document). The control data for a print job 102 may comprise a job ticket (e.g., Job Definition Format (JDF) job ticket), or other information describing attributes for printing the print job 102 (e.g., media size, number of copies, color or greyscale, resolution, etc.). As will be described in more detail below, print job converter 214 is configured to convert the printable content and control data of a print job 102 into multiple print streams 222. A print stream 222 comprises print data in a printable output format or a device-specific format that a printer 121-123 consumes directly to print content on print media.

In other words, print job converter 214 is configured to convert the printable content and control data of a print job 102 into multiple PDL-compliant print streams for the different printers 121-123. A PDL-compliant print stream contains the printable content and control data of a print job 102 that is formatted according to the PDL interpretable or understood by a printer 121-123. Thus, print job converter 214 may act as the last stage in creating or formatting a PDL-compliant print stream for a printer.

Each print stream 222 generated by print job converter 214 from the print job 102 is specific to a candidate printer for printing the print job 102. For example, assume that printers 121-123 are candidates for printing a print job 102. In this example, print stream 222-1 may be specific for printer 121, print stream 222-2 may be specific for printer 122, and print stream 222-3 may be specific for printer 123. Each printer 121-123 requires a different print stream 222 for printing the print job 102, such as based on a PDL used at the printer 121-123, specification or attributes of the printer 121-123, etc. Thus, print job converter 214 transforms the printable content and control data of a print job 102 into different print streams 222 for the different printers 121-123. A collection of the printer-specific print streams 222 is referred to as a print job package 220 that is stored by printing front-end application 206.

Figure 3:
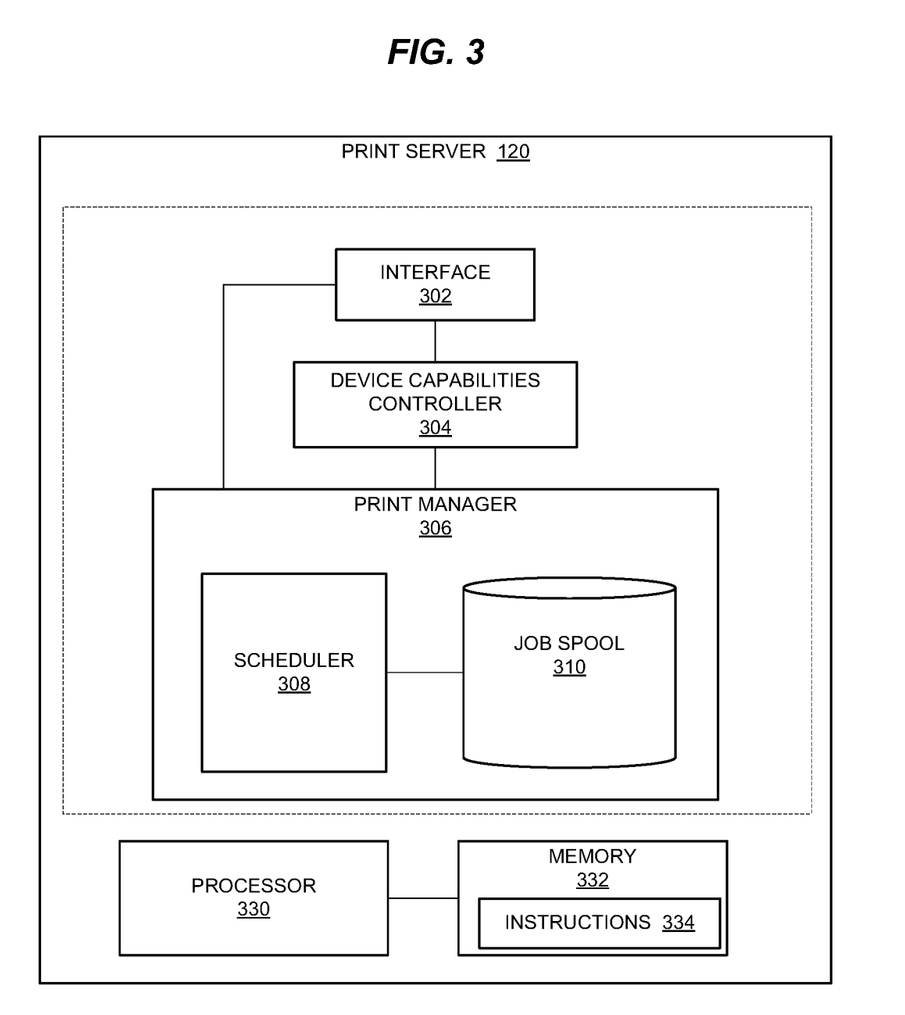
FIG. 3 is a block diagram of a print server in an illustrative embodiment.

FIG. 3 is a block diagram of print server 120 in an illustrative embodiment. In this embodiment, print server 120 includes the following subsystems: an interface component 302, a device capabilities controller 304, and a print manager 306. Interface component 302 is a hardware component or circuitry that communicates with external device, systems, or entities, such as printers 121-123 and the printing front-end application 206. For example, interface component 302 may exchange communications with printers 121-123 based on a native protocol of the printers 121-123. Interface component 302 may also exchange communications with the printing front-end application 206 over a network connection 132 via the internet 130, such as messages, data (e.g., print streams), Application Programming Interface (API) calls, etc. Interface component 302 may use a variety of protocols for communication.

Device capabilities controller 304 comprises circuitry, logic, hardware, means, etc., configured to acquire device capability information 211 for printers 121-123 and/or other devices. For example, device capabilities controller 304 may query printers 121-123 to acquire device capability information 211, may receive input regarding the device capability information 211 (e.g., from an operator, from a manufacturer, etc.), or otherwise acquire the device capability information 211. Device capabilities controller 304 is further configured to interact with printing front-end application 206 to provide the device capability information 211 to printing front-end application 206.

Print manager 306 comprises circuitry, logic, hardware, means, etc., configured to supervise or manage a plurality of printers 121-123 and printing processes performed by the printers 121-123. In one embodiment, print manager 306 includes a scheduler 308 and a job spool 310. Job spool 310 comprises a memory configured to temporarily store or queue print streams for print jobs 102 received at print server 120. Scheduler 308 is configured to schedule the print streams from job spool 310 at one or more of printers 121-123.

One or more of the subsystems of print server 120 may be implemented on a hardware platform comprised of analog and/or digital circuitry. One or more of the subsystems of print server 120 may be implemented on a processor 330 that executes instructions 334 stored in memory 332. A processor 330 comprises an integrated hardware circuit configured to execute instructions 334 to provide the functions of print server 120. Processor 330 may comprise a set of one or more processors or may comprise a multi-processor core, depending on the particular implementation. Memory 332 is a non-transitory computer readable medium for data, instructions, applications, etc., and is accessible by processor 330. Memory 332 is a hardware storage device capable of storing information on a temporary basis and/or a permanent basis. Memory 332 may comprise a random-access memory, or any other volatile or non-volatile storage device.

Figure 4:
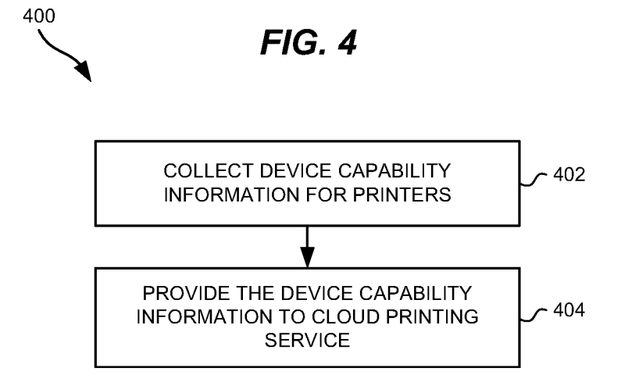
FIG. 4 is a flow chart illustrating a method of operating a print server in combination with a cloud printing service in an illustrative embodiment.

FIG. 4 is a flow chart illustrating a method 400 of operating print server 120 in combination with a cloud printing service 110 in an illustrative embodiment. The steps of method 400 will be described with reference to print server 120 in FIG. 3, but those skilled in the art will appreciate that method 400 may be performed in other systems or devices. Also, the steps of the flow charts described herein are not all inclusive and may include other steps not shown, and the steps may be performed in an alternative order.

Device capabilities controller 304 of print server 120 obtains, receives, or collects device capability information 211 for printers 121-123 (step 402). Device capabilities controller 304 may collect the device capability information 211 in a variety of ways. In one embodiment, device capabilities controller 304 may communicate with the printers 121-123 to request the device capability information 211, such as through interface component 302. For example, device capabilities controller 304 may use Job Messaging Format (JMF), SNMP, or another protocol to query printers 121-123 for the device capability information 211, printer status (e.g., availability, toner/ink levels, number of pages printed, etc.), and/or other information. In one embodiment, an operator of print shop 126 or another user may enter the device capability information 211 into device capabilities controller 304, such as through a Graphical User Interface (GUI). In one embodiment, device capabilities controller 304 may obtain the device capability information 211 from a manufacturer of the printer 121-123 or another entity. Device capabilities controller 304 may collect the device capability information 211 in these and/or other ways to build a capability profile for each of the printers 121-123.

Figure 5:
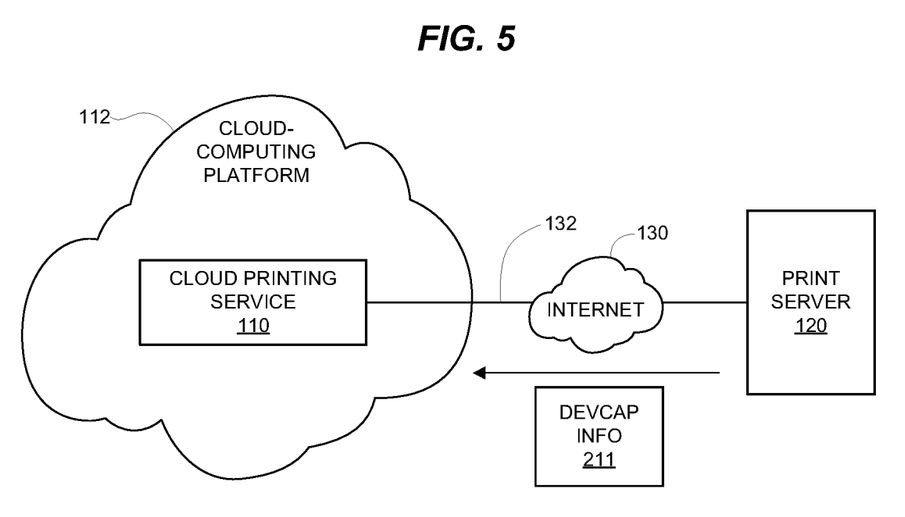
FIG. 5 is a block diagram of a print server providing device capability information to a cloud printing service in an illustrative embodiment.

Device capabilities controller 304 transmits, uploads, or provides the device capability information 211 to the cloud printing service 110 (step 404). For example, interface component 302 may establish a network connection 132 with the cloud printing service 110 over the internet 130, and device capabilities controller 304 may transmit the device capability information 211 to the cloud printing service 110 over the network connection 132. Device capabilities controller 304 may transmit the device capability information 211 as a batch for printers 121-123, or may transmit the device capability information 211 individually for printers 121-123. FIG. 5 is a block diagram of print server 120 providing the device capability information 211 to the cloud printing service 110 in an illustrative embodiment. Although the above describes device capability information 211 for printers 121-123, it is understood that the device capability information 211 may be for any type of device in print shop 126, such as pre-print devices or finishing devices associated with printers 121-123.

Figure 6:
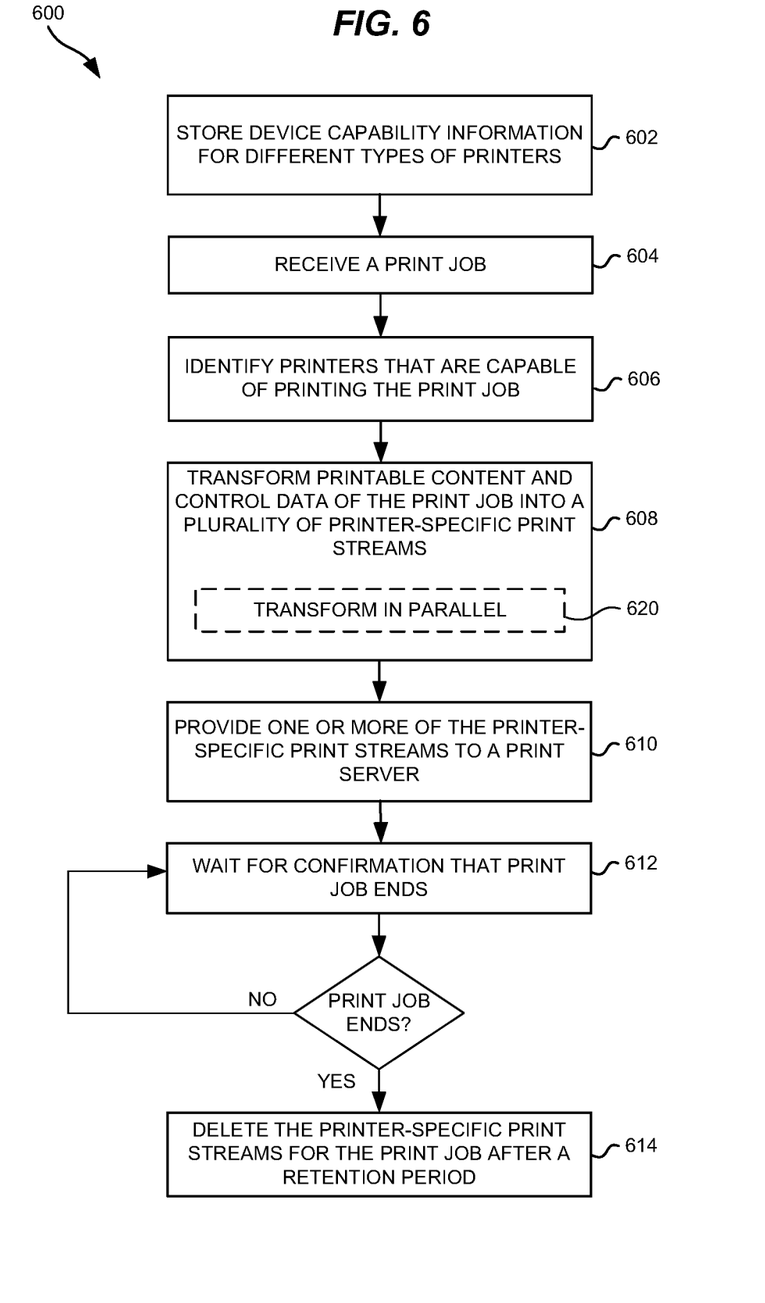
FIG. 6 is a flow chart illustrating a method of providing a cloud printing service in an illustrative embodiment.

FIG. 6 is a flow chart illustrating a method 600 of providing a cloud printing service 110 in an illustrative embodiment. The steps of method 600 will be described with reference to printing front-end application 206 in FIG.

2, but those skilled in the art will appreciate that method 600 may be performed in other applications or systems on a cloud-computing platform.

Device capabilities controller 210 of printing front-end application 206 stores device capability information 211 for printers 121-123 (step 602), such as received from print server 120. Because printers 121-123 are of different types, the device capability information 211 for each printer 121-123 may be distinct. Device capabilities controller 210 may store the device capability information 211 in a profile or device capability file for each of the printers 121-123 and/or other devices of print shop 126. Device capabilities controller 210 may also manage or update the device capability information 211 as needed by contacting print server 120 and requesting any desired updates. Device capabilities controller 210 may also make the device capability information 211 available to user interface 212 for use in a print tools page or the like, where a user 140 is able to select a particular printer 121-123 for a print job 102.

Through user interface 212 provided by printing front-end application 206, a user 140 is able to access the cloud printing service 110 to request a printing process for a print job 102. For example, user interface 212 (through portal 213) may provide a print tools page or the like to the user 140 in accessing the cloud printing service 110. The user 140 may provide a file or document (or multiple files or documents) for a print job 102, such as by uploading the file, specifying a path on a local computer or a Uniform Resource Locator (URL) for the file, etc. The user 140 may also specify control data for the print job 102. For example, the user 140 may provide a job ticket (e.g., a JDF job ticket) that describes attributes for the print job 102. The job ticket may include job settings or a job description for any pre-print, print, post-print, and/or delivery of the print job. User interface 212 may also allow the user 140 to enter one or more attributes for the print job 102 into the print tools page or the like.

Figure 7:
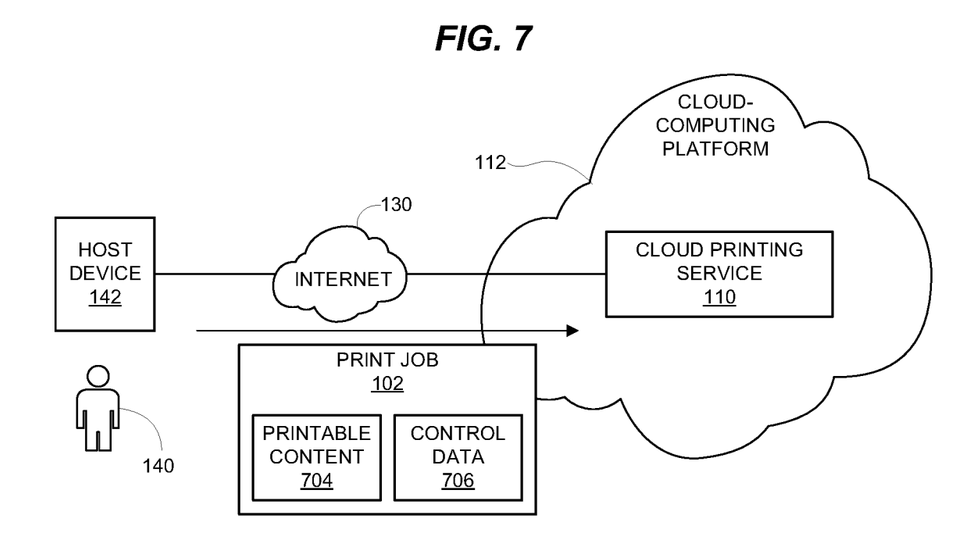
FIG. 7 is a block diagram illustrating a cloud printing service receiving a print job from a user in an illustrative embodiment.

Thus, user interface 212 receives a print job 102 (step 604), such as from user 140. FIG. 7 is a block diagram illustrating the cloud printing service 110 receiving a print job 102 from a user 140 in an illustrative embodiment. Print job 102, as received by the cloud printing service 110, includes printable content 704 (e.g., a file or document) and control data 706. The printable content 704 is independent from a printer and is not formatted according to a PDL for a printer (i.e., non-PDL-compliant), which means the printable content 704 is not directly consumable by a printer. The control data 706 may also be considered as a separate "package" from the printable content 704, such as a job ticket.

In response to receiving the print job 102 in FIG. 6, print job converter 214 of printing front-end application 206 identifies printers 121-123 that are capable of printing the print job 102 based on the device capability information 211 (step 606). Print job converter 214 may process the control data 706 for the print job 102, and determine which printers 121-123 (also referred to as candidate printers) are capable of and/or configured to print the print job 102 based on the device capability information 211 specified for each printer 121-123. For example, if the control data 706 for the print job 102 specifies color printing, then print job converter 214 determines which of printers 121-123 are capable of printing in color based on the device capability information 211. If the control data 706 for the print job 102 specifies printing on high-gloss stock, then print job converter 214 determines which of printers 121-123 are loaded with high-gloss stock based on the device capability information 211. Print job converter 214 may identify a single printer 121-123 that is capable of printing the print job 102, but it is assumed for this embodiment that multiple printers 121-123 are capable of printing the print job 102. It is also assumed that print job converter 214 identifies printers 121-123 of different types that have different specifications.

Print job converter 214 transforms or converts the printable content 704 and control data 706 of the print job 102 into a plurality of printer-specific print streams 222 (step 608). As described above, a printer-specific print stream 222 comprises print data in a printable output format or a device-specific format for a specific printer that the printer consumes directly. For example, when printer 121 is capable of printing the print job 102, print job converter 214 transforms the printable content 704 and control data 706 of the print job 102 into a printer-specific print stream 222-1 for printer 121 (see also, FIG. 2). Likewise, when printer 122 and printer 123 are capable of printing the print job 102, print job converter 214 transforms the printable content 704 and control data 706 of the print job 102 into a printer-specific print stream 222-2 for printer 122 and a printer-specific print stream 222-3 for printer 123. The printer-specific print streams 222 may also be referred to as PDL-compliant print streams for specific printers 121-123. Print job converter 214 may process the device capability information 211 for a printer 121-123 to determine which printable output format or a device-specific format is used for that printer 121-123, and transform the printable content 704 and control data 706 accordingly.

Print job converter 214 may have processing resources 202 and storage resources 204 available to transform the printable content 704 and control data 706 of the print job 102 into the printer-specific print streams 222 in parallel (optional step 620). In other words, print job converter 214 may generate the printer-specific print streams 222 simultaneously from the printable content 704 and control data 706.

Printers 121-123 of different types are configured to receive a print stream 222 in a different printable output format. For example, printers 121-123 from different manufacturers may use different printable output formats. In another example, different models of printers 121-123 from the same manufacturer may use different printable output formats. Thus, print job converter 214 creates a printer-specific print stream 222 for each of the candidate printers 121-123 based on the printable output formats for those candidate printers 121-123. Print job converter 214 stores the printer-specific print streams 222 in a storage location (e.g., storage resources 204) as a print job package 220 that is available to print server 120. Print job converter 214 may also store metadata for the printer-specific print streams 222, such as printer identifiers (IDs) for the printers 121-123 that are mapped to the printer-specific print streams 222.

In FIG. 6, print job converter 214 provides one or more of the printer-specific print streams 222 to print server 120 (step 610). In other words, print job converter 214 makes the printer-specific print streams 222 available to print server 120 for use in printing the print job 102. For example, print job converter 214 may provide a path (e.g., URL) to the printer-specific print streams 222 at a storage location, may store the printer-specific print streams 222 in a shared storage location, may transmit the printer-specific print streams 222 to the print server 120 over the network connection 132, etc. Print job converter 214 then waits for confirmation that the print job 102 has ended (step 612).

Figure 8:
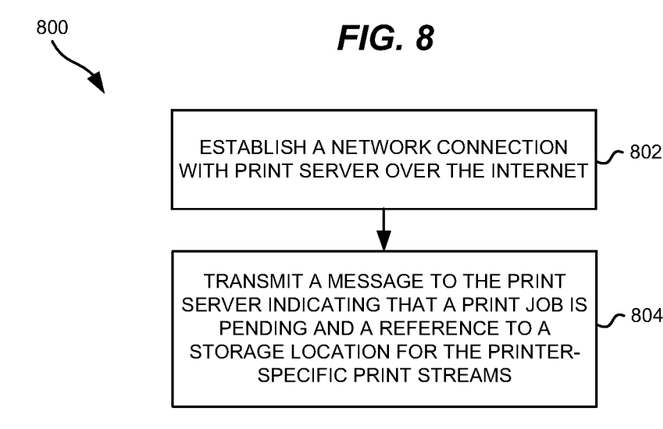
FIG. 8 is a flow chart illustrating a method of providing printer-specific print streams to a print server in an illustrative embodiment.

Although print job converter 214 may provide the printer-specific print stream(s) 222 to print server 120 in a variety of ways, one way is for the print server 120 to pull the printer-specific print stream(s) 222 from the cloud printing service 110. FIG. 8 is a flow chart illustrating a method 800 of providing printer-specific print streams 222 to print server 120 in an illustrative embodiment. In this embodiment, print job converter 214 may set up or establish a network connection 132 (e.g., secure network connection) with print server 120 over the internet 130 (step 802), if not already established. Print job converter 214 transmits a notification or message to print server 120 indicating that a print job 102 is pending (step 804). In one embodiment, print job converter 214 may transmit the message to the print server 120 over the network connection 132. In other embodiments, print job converter 214 may send an email with the message, or may otherwise notify print server 120 of the pending print job 102. The message from print job converter 214 may include metadata for the print job 102, such as a customer ID for the user 140 submitting the print job 102, a job ID or name for the print job 102, a list of printers 121-123 that are capable of printing the print job 102, and/or other information. The metadata for the print job 102 may include a reference to the print job package 220 and/or printer-specific print streams 222 generated for the print job 102, such as storage location (e.g., URL) where the print job package 220 and/or printer-specific print streams 222 are stored. The metadata for the print job 102 may indicate a primary printer 121-123 for printing the print job 102, a secondary or alternate printer 121-123, etc.

Figure 9:
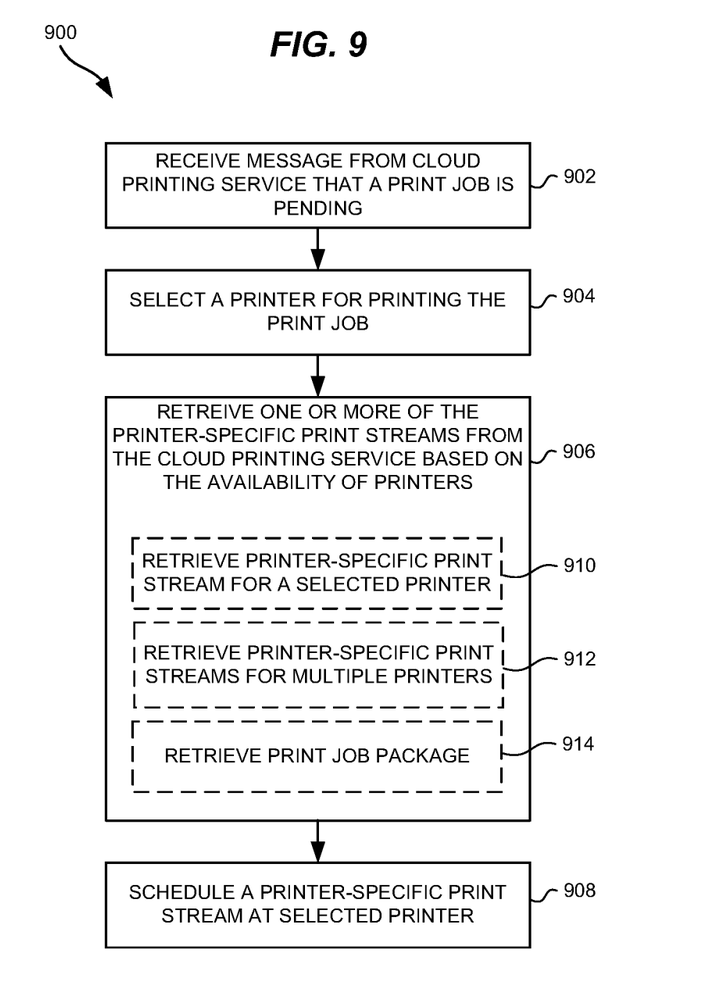
FIG. 9 is a flow chart illustrating a further method of operating a print server in combination with a cloud printing service in an illustrative embodiment.

FIG. 9 is a flow chart illustrating a further method 900 of operating print server 120 in combination with a cloud printing service 110 in an illustrative embodiment. In FIG. 9, print manager 306 of print server 120 receives the message or notification from the cloud printing service 110 that a print job 102 is pending (step 902). Print manager 306 selects a printer 121-123 for printing the print job 102 (step 904). In selecting the printer 121-123 for the print job 102, print manager 306 may determine which printers 121-123 are capable of and/or configured to print the print job 102, determine the availability of printers 121-123 for printing the print job 102, and select one (or more) of the printers 121-123 based on capability and availability. For example, print manager 306 may query device capabilities controller 304 to determine capability, may poll printers 121-123 to determine availability or printer status, may process an internal queue or the like to determine availability, etc. Print manager 306 may determine which of the printers 121-123 are capable of printing the print job 102 based on the metadata for the print job 102 provided by the cloud printing service 110. It is noted that print manager 306 may select multiple printers 121-123 for printing the print job 102.

With network connection 132 established, print manager 306 retrieves, requests, or obtains one or more of the printer-specific print streams 222 for the print job 102 from the cloud printing service 110 (step 906). Print manager 306 may retrieve one, several, or all of the printer-specific print streams 222 in the print job package 220 from the cloud printing service 110 over the network connection 132. In one embodiment, print manager 306 may select a single one of the printers 121-123 for printing the print job 102. In response to selecting a single printer 121-123, print manager 306 may retrieve the printer-specific print stream 222 (e.g., a first printer-specific print stream) from the cloud printing service 110 exclusively for the selected printer 121-123 (optional step 910). This may be beneficial as the only the printer-specific print stream 222 for the selected printer 121-123 is sent over the network connection 132. In one embodiment, print manager 306 may determine that multiple printers 121-123 are available for printing the print job 102, and retrieve the printer-specific print streams 222 from the cloud printing service 110 for the multiple printers 121-123 determined to be available (optional step 912). This may be beneficial when printing duties will be shared among multiple printers 121-123, when print manager 306 has identified a primary and alternate printer 121-123, etc. In one embodiment, print manager 306 may retrieve the print job package 220 from the cloud printing service 110 that contains each of the printer-specific print streams 222 generated by the cloud printing service 110 (optional step 914). This may be beneficial as the print server 120 will receive the printer-specific print streams 222 for each of the printers 121-123, and can dynamically select which printer(s) 121-123 to use or may switch between printers 121-123, such as in response to a print error on one of the printers 121-123 (e.g., out of paper, toner, or ink, paper jam, etc.).

After retrieving one or more of the printer-specific print streams 222 from the cloud printing service 110, print manager 306 may store the printer-specific print stream(s) 222 in memory 332. Print manager 306 (through scheduler 308) schedules a printer-specific print stream 222 for the print job 102 at the selected printer 121-123 (step 908). For example, print manager 306 may select a first printer (e.g., printer 121) for the print job 102 (if not already selected), and schedule the first printer-specific print stream 222 for the print job 102 at the first printer 121. According to the schedule for the selected printer 121-123, print manager 306 submits, delivers, or transfers the printer-specific print stream 222 for the print job 102 to the selected printer 121-123. Because the printer-specific print stream 222 is in the appropriate format, the selected printer 121-123 is able to directly print the printer-specific print stream 222 and generate print output for the print job 102. It is noted that print manager 306 may schedule different printer-specific print streams 222 for the print job 102 on different printers 121-123 as desired, such as to print different portions of the print job 102.

Figure 10:
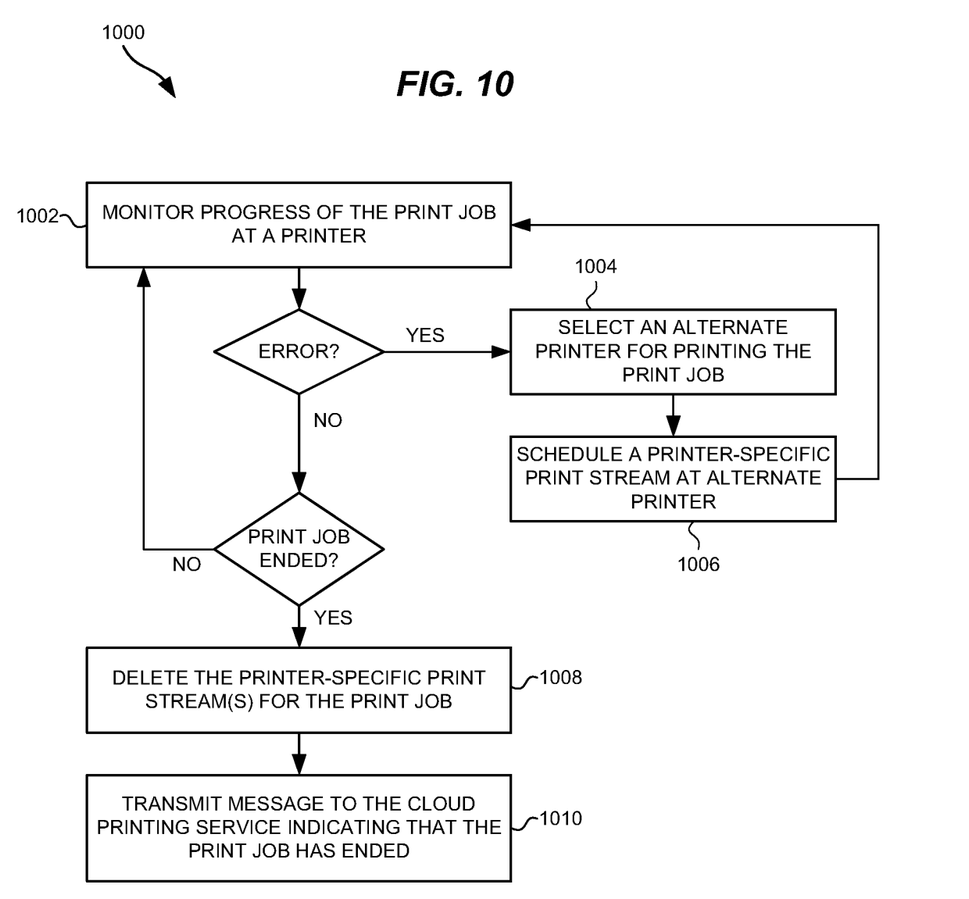
FIG. 10 is a flow chart illustrating a further method of operating a print server in combination with a cloud printing service in an illustrative embodiment.

FIG. 10 is a flow chart illustrating a further method 1000 of operating print server 120 in combination with a cloud printing service 110 in an illustrative embodiment. After scheduling the printer-specific print stream 222 to a selected printer 121-123, print manager 306 monitors the progress of the print job 102 at the selected printer 121-123 (step 1002). When an error occurs in printing the print job 102 at the selected printer 121-123, print manager 306 may select an alternate or substitute printer 121-123 for the print job 102 (step 1004) or identify a printer 121-123 previously-selected as an alternate. Print manager 306 retrieves or obtains the printer-specific print stream 222 (e.g., second printer-specific print stream) for the alternate printer 121-123. For example, print manager 306 may retrieve the printer-specific print stream 222 for the alternate printer 121-123 from the cloud printing service 110 over the network connection 132. If the printer-specific print stream 222 for the alternate printer 121-123 was already retrieved from the cloud printing service 110, print manager 306 may retrieve the printer-specific print stream 222 for the alternate printer 121-123 from local memory (e.g., memory 332). Print manager 306 (through scheduler 308) schedules the printer-specific print stream 222 for the print job 102 at the alternate printer 121-123 (step 1006).

When the print job 102 has finished or ended (e.g., printing has completed), print manager 306 deletes the printer-specific print stream(s) 222 for the print job 102 from memory 332 (step 1008). Print manager 306 also transmits a status message to the cloud printing service 110 indicating that the print job 102 has ended (step 1010), such as over the network connection 132. The status message may further include audit information (e.g., amount of paper used, amount of ink used etc.) or other information. In FIG. 6, when print job converter 214 receives a status message confirming that the print job 102 has ended, print job converter 214 deletes the printer-specific print stream(s) 222 for the print job 102 after a retention period (step 614). Print job converter 214 or print server 120 may then tear down the network connection 132.

One technical benefit of the cloud printing service 110 as discussed above is the process of transforming the printable content 704 and control data 706 of a print job 102 into a printer-specific print stream 222 is decoupled from a print server 120 that manages a plurality of printers 121-123. A print server 120 has limited processing and memory resources whereas a cloud-computing platform 112 is "serverless" and can spin up additional resources as needed for processing. The cloud printing service 110 can convert the printable content 704 and control data 706 of the print job 102 into a plurality of printer-specific print streams 222 in parallel, and make the printer-specific print streams 222 available to the print server 120 for use as needed at individual printers 121-123. The print server 120 may therefore be lightweight without any printer drivers, if desired.

Figure 11:
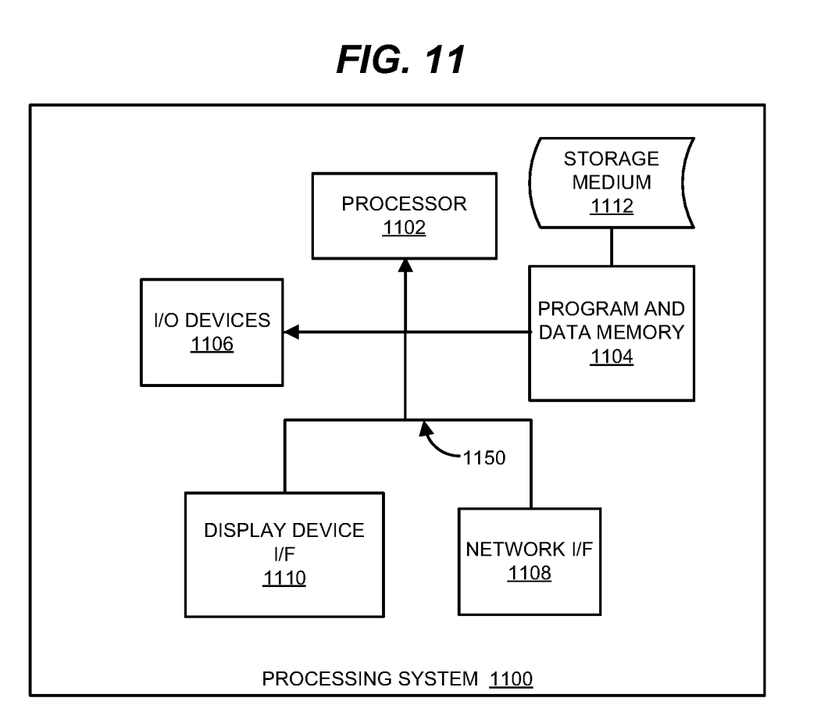
FIG. 11 illustrates a processing system operable to execute a computer readable medium embodying programmed instructions to perform desired functions in an illustrative embodiment.

Embodiments disclosed herein can take the form of software, hardware, firmware, or various combinations thereof. FIG. 11 illustrates a processing system 1100 operable to execute a computer readable medium embodying programmed instructions to perform desired functions in an illustrative embodiment. Processing system 1100 is operable to perform the above operations by executing programmed instructions tangibly embodied on computer readable storage medium 1112. In this regard, embodiments can take the form of a computer program accessible via computer-readable medium 1112 providing program code for use by a computer or any other instruction execution system. For the purposes of this description, computer readable storage medium 1112 can be anything that can contain or store the program for use by the computer.

Computer readable storage medium 1112 can be an electronic, magnetic, optical, electromagnetic, infrared, or semiconductor device. Examples of computer readable storage medium 1112 include a solid-state memory, a magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

Processing system 1100, being suitable for storing and/or executing the program code, includes at least one processor 1102 coupled to program and data memory 1104 through a system bus 1150. Program and data memory 1104 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 1106 (including but not limited to keyboards, displays, pointing devices, etc.) can be coupled either directly or through intervening I/O controllers. Network adapter interfaces 1108 may also be integrated with the system to enable processing system 1100 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 1110 may be integrated with the system to interface to one or more display devices, such as printing systems and screens for presentation of data generated by processor 1102.

Although specific embodiments were described herein, the scope of the invention is not limited to those specific embodiments. The scope of the invention is defined by the following claims and any equivalents thereof

What is claimed is:

1. A printing system, comprising:
processing resources and storage resources provisioned on a cloud-computing platform to implement a cloud printing service, the processing resources at least cause the cloud printing service to:
store device capability information for different types of printers supervised by a print server;
receive a print job comprising printable content and control data;
identify a plurality of the printers capable of printing the print job based on the device capability information;
transform the printable content and the control data of the print job into a plurality of printer-specific print streams each in a printable output format for a different one of the plurality of the printers;
store the printer-specific print streams in the storage resources of the cloud-computing platform; and
provide one or more of the printer-specific print streams to the print server.

2. The printing system of claim 1, wherein the processing resources at least cause the cloud printing service to:
wait for confirmation from the print server that the print job has ended; and
delete the printer-specific print streams after a retention period in response to receiving the confirmation.

3. The printing system of claim 1, wherein the processing resources at least cause the cloud printing service to:
transform the printable content and the control data of the print job into the plurality of printer-specific print streams in parallel.

4. The printing system of claim 1, further comprising:
the print server comprising at least one processor and memory;
the at least one processor causes the print server to:
receive a message from the cloud printing service that the print job is pending;
select a printer from the plurality of the printers as a selected printer for printing the print job;
retrieve the one or more of the printer-specific print streams from the cloud printing service, wherein the one or more of the printer-specific print streams retrieved by the print server includes a first printer-specific print stream for the selected printer; and
schedule the first printer-specific print stream to print at the selected printer.

5. The printing system of claim 4, wherein the at least one processor causes the print server to:
retrieve the first printer-specific print stream from the cloud printing service exclusively in response to selecting the selected printer for printing the print job.

6. The printing system of claim 4, wherein the at least one processor causes the print server to:
retrieve multiple ones of the printer-specific print streams from the cloud printing service for multiple printers of the plurality of the printers determined to be available to print the print job.

7. The printing system of claim 4, wherein the at least one processor causes the print server to:
retrieve a print job package from the cloud printing service that contains each of the printer-specific print streams generated by the cloud printing service.

8. The printing system of claim 4, wherein the at least one processor causes the print server to:
monitor progress of the print job at the selected printer;
select, when an error occurs, another printer from the plurality of the printers as an alternate printer for printing the print job, wherein the one or more of the printer-specific print streams retrieved by the print server includes a second printer-specific print stream for the alternate printer; and
schedule the second printer-specific print stream to print at the alternate printer.

9. A method comprising:
storing, at a cloud printing service implemented on a cloud-computing platform, device capability information for different types of printers supervised by a print server;
receiving, at the cloud printing service, a print job comprising printable content and control data;
identifying, at the cloud printing service, a plurality of the printers capable of printing the print job based on the device capability information;
transforming, at the cloud printing service, the printable content and the control data of the print job into a plurality of printer-specific print streams each in a printable output format for a different one of the plurality of the printers;
storing the printer-specific print streams in storage resources of the cloud-computing platform; and
providing one or more of the printer-specific print streams from the cloud printing service to the print server.

10. The method of claim 9, further comprising:
waiting, at the cloud printing service, for confirmation from the print server that the print job has ended; and
deleting the printer-specific print streams from the cloud printing service after a retention period in response to receiving the confirmation.

11. The method of claim 9, wherein transforming the printable content and the control data of the print job into the plurality of printer-specific print streams comprises:
transforming the printable content and the control data of the print job into the plurality of printer-specific print streams in parallel.

12. The method of claim 9, further comprising:
receiving, at the print server, a message from the cloud printing service that the print job is pending;
selecting, at the print server, a printer from the plurality of the printers as a selected printer for printing the print job;
retrieving, at the print server, the one or more of the printer-specific print streams from the cloud printing service, wherein the one or more of the printer-specific print streams retrieved by the print server includes a first printer-specific print stream for the selected printer; and
scheduling, at the print server, the first printer-specific print stream to print at the selected printer.

13. The method of claim 12, wherein retrieving the one or more of the printer-specific print streams from the cloud printing service comprises:
retrieving the first printer-specific print stream from the cloud printing service exclusively in response to selecting the selected printer for printing the print job.

14. The method of claim 12, wherein retrieving the one or more of the printer-specific print streams from the cloud printing service comprises:
retrieving multiple ones of the printer-specific print streams from the cloud printing service for multiple printers of the plurality of the printers determined to be available to print the print job.

15. The method of claim 12, wherein retrieving the one or more of the printer-specific print streams from the cloud printing service comprises:
retrieving a print job package from the cloud printing service that contains each of the printer-specific print streams generated by the cloud printing service.

16. The method of claim 12, further comprising:
monitoring, at the print server, progress of the print job at the selected printer;
selecting, when an error occurs, another printer from the plurality of the printers as an alternate printer for printing the print job, wherein the one or more of the printer-specific print streams retrieved by the print server includes a second printer-specific print stream for the alternate printer; and
scheduling the second printer-specific print stream to print at the alternate printer.

17. A non-transitory computer readable medium embodying programmed instructions executed by a processor, wherein the instructions direct the processor to implement a method of operating a printing system, the method comprising:
storing, at a cloud printing service implemented on a cloud-computing platform, device capability information for different types of printers supervised by a print server;
receiving, at the cloud printing service, a print job comprising printable content and control data;
identifying, at the cloud printing service, a plurality of the printers capable of printing the print job based on the device capability information;
transforming, at the cloud printing service, the printable content and the control data of the print job into a plurality of printer-specific print streams each in a printable output format for a different one of the plurality of the printers;
storing the printer-specific print streams in storage resources of the cloud-computing platform; and
providing one or more of the printer-specific print streams from the cloud printing service to the print server.

18. The computer readable medium of claim 17, wherein the method further comprises:
waiting, at the cloud printing service, for confirmation from the print server that the print job has ended; and
deleting the printer-specific print streams from the cloud printing service after a retention period in response to receiving the confirmation.

19. The computer readable medium of claim 17, wherein the method further comprises:
receiving, at the print server, a message from the cloud printing service that the print job is pending;
selecting, at the print server, a printer from the plurality of the printers as a selected printer for printing the print job;
retrieving, at the print server, the one or more of the printer-specific print streams from the cloud printing service, wherein the one or more of the printer-specific print streams retrieved by the print server includes a first printer-specific print stream for the selected printer; and scheduling, at the print server, the first printer-specific print stream to print at the selected printer.

20. The computer readable medium of claim 19, wherein the method further comprises:
   monitoring, at the print server, progress of the print job at the selected printer;
   selecting, when an error occurs, another printer from the plurality of the printers as an alternate printer for printing the print job, wherein the one or more of the printer-specific print streams retrieved by the print server includes a second printer-specific print stream for the alternate printer; and
   scheduling the second printer-specific print stream to print at the alternate printer.

\* \* \* \* \*